INVENTOR
Herbert Witzenmann
BY Spencer & Kaye
ATTORNEYS

United States Patent Office 3,260,636
Patented July 12, 1966

3,260,636
METHOD OF FORMING A LONGITUDINALLY SLOTTED AND CORRUGATED TUBE
Herbert Witzenmann, Pforzheim, Baden, Germany, assignor to Metallschlauch-Fabrik Pforzheim vorm. Hch. Witzenmann G.m.b.H., Pforzheim, Germany
Filed Mar. 8, 1965, Ser. No. 438,003
Claims priority, application Germany, June 10, 1959, M 41,780
12 Claims. (Cl. 156—203)

This application is a continuation-in-part of my copending application Serial No. 30,067, filed May 19, 1960, now abandoned.

The present invention relates to a method of producing corrugated tubes.

It is already known in the art of making corrugated tubes that such tubes may be produced by winding pre-shaped strips of metal, plastic, paper or the like in a helical direction so that the overlapping edges of the adjacent convolutions of the wound strips will be positively or tightly connected to each other. The method has, however, the disadvantage that, because of the deformation of the profile of the strips caused by the winding operation, only relatively narrow pre-shaped strips can be used. Furthermore, this known method is necessarily limited to a helical shape of the corrugations. Finally, since a considerable part of the width of the strip is required for connecting the convolutions tightly to each other, the number of corrugations within a certain length of tubing is thereby limited.

Another known method of producing corrugated tubes consists in first shaping a flat strip into a slotted tube and in connecting the overlapping edges of the tube which extend parallel to the axis thereof so as to engage with each other so that a tube will be formed with a seam extending parallel to the axis. After the tube is thus completed, the corrugations are formed therein which in this case may be either a succession of individual corrugations or a continuous helical corrugation. If the depth of the corrugations in comparison to the diameter of the tube and the wall strength thereof requires a considerable molding or bending effort, it is not possible to proceed according to the method in which the tubes are bent from a flat strip and are merely provided with a flanged seam or the like, since the seam will then have the tendency to open and the corrugated tube will not be pressure and fluid tight. In such a case it is only possible to provide a tube with overlapping edge areas which extend parallel to its axis and which are then tightly closed by welding. This necessarily means that such tubes can only be made of materials which are capable of being soldered or welded, that is, of metals, plastics, or the like. On the other hand, in metals which can be welded only with difficulty or not at all, it is usually too difficult and expensive to close the overlapped edge areas by soldering. If corrugated tubes are required to consist of other than easily weldable materials, it has so far been necessary to resort to draw seamless tubes with a smooth outer surface which were subsequently provided with corrugations. The cost of such tubes is obviously very considerable. If the tubes are made of easily weldable materials, it is necessary for forming the welded seam to provide at the inside of the tube an electrode which can only be of a limited length and therefore requires the seam to be welded intermittently rather than continuously. Furthermore, especially when the seam has to be very tight, the welding operation requires a greater length of time than the other stages of the production of such tubes so that a continuous production is impossible.

It is an object of the present invention to provide a method of producing corrugated tubes which overcomes the above-mentioned disadvantages of the previously known methods.

Another object of the invention is to provide a method of producing corrugated tubes of any metals, plastics, or other materials which are either weldable, non-weldable, or only weldable with difficulty. A further object of the invention is to provide such a method which permits such corrugated tubes to be produced in one continuous operation, of any desired length, and at a considerable speed.

These objects may be attained according to the invention by using a flat strip of whatever material may be desired and then first forming a slotted tube with overlapping edge areas extending parallel to its axis by means of a suitable shaping tool, then, while this tube is still being worked on by this tool, coating at least one of the overlapping edges of the tube with an adhesive which is suitable for the particular material, then while the tube runs along its production line, allowing the adhesive to partly to harden, and then providing the tube, which is thus formed and held together by the partly hardened adhesive with corrugations by means of a corrugating tool of a conventional type, and thereafter allowing the adhesive to harden completely while the tube is still moving along the production line and, if necessary, also during the subsequent time of storage of the finished corrugated tube.

More particularly, the present invention resides in a method of making corrugated tubes which comprises the following steps:

(a) First, a flat strip of material is shaped to form a tube with a longitudinal slot, and at least one of the two overlapping parallel edges of the tube is coated with an adhesive which is suitable for the particular material of the tube. This adhesive is one which hardens in two stages, the first stage being one wherein the adhesive is only partially hardened and is still yieldable to shearing stresses to which the adhesive, while it is in its first stage, will be subjected during a subsequent operation in which the tube is corrugated, and the second stage being one in which the adhesive is fully hardened and no longer able to yield to such shearing stresses.

(b) Next, the overlapping edges of the slotted tube are pressed together to form a seam.

(c) Finally, the tube is corrugated while the adhesive is still in the above-mentioned first stage. As a result of this, the adhesive will not attain its second stage until the need for allowing for a shearing stress has passed.

Additional objects and advantages of the present invention will become apparent upon consideration of the following description when taken in conjunction with the accompanying drawings in which:

FIGURE 2 also shows the applicator by means of which the adhesive is applied.

Figure 1:
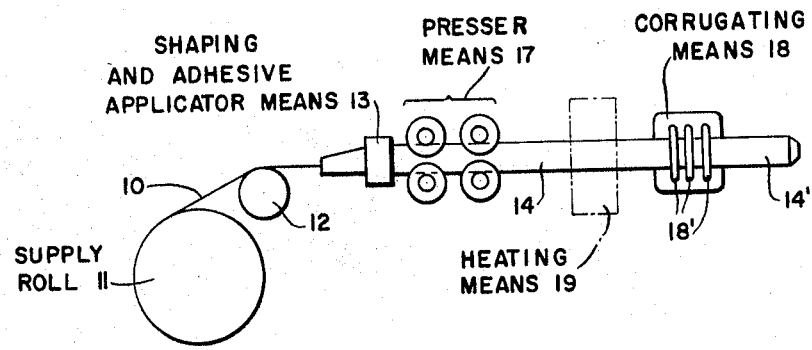
FIGURE 1 is a schematic diagram showing an apparatus for manufacturing corrugated tubing in accordance with the present invention.

Referring now to the drawings and first to FIGURE 1 thereof, the same shows a flat strip 10 taken off a supply roll 11 and passing over a guide roller 12 to a shaping tool 13 by means of which the originally flat strip 10 is given its rounded cross section, i.e., the shape of the slotted tube. Arranged behind the shaping tool 13, considered in the direction of movement of the strip, there is a mandrel 14 onto which runs the strip after having been shaped by the tool 13. Inasmuch as the slotted tubing 16 is very thin, the same is not shown in the immediate vicinity of the mandrel 14, but is shown in FIGURE 2.

Figure 2:
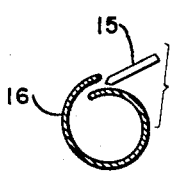
FIGURE 2 is a sectional view of the as yet uncorrugated tube while the same still has open, overlapping edges.

The shaping tool 13 has coacting with it an applicator 15, shown in FIGURE 2, by means of which at least one of the open and overlapping edge surfaces of the slotted tubing has a layer of adhesive applied. It will be appreciated that, for purposes of illustration, the thickness of the tubing is shown exaggerated with respect to the diameter of the tube.

As the slotted tubing leaves the tool 13 and moves over the mandrel 14, it is subjected to the action of presser means 17 in which the edges of the tubing, as shown in FIGURE 2, are pressed together. The presser means may be constituted by pressure rollers which, in practice, may also serve as the means for drawing the tubing and hence for winding the strip off the supply roll 11. It will be appreciated, however, that the presser means may be constituted by any other suitable structure, per se well known in the art, and that the tubing may be advanced rightwardly, as viewed in FIGURE 1, by any other suitable means.

The tubing moves from the presser means 17 to a corrugating means 18 whereat the tubing has corrugations imparted to it. The corrugating means themselves may be of any suitable construction. For instance, if the tubing is to have annular corrugations, the corrugating means may be constituted by matrices 18′ which are mounted within the mandrel 14 and which, at suitable instants, are caused to move outwardly by means of a linkage whose operation is synchronized with the feed of the tubing. In practice, the tubing will be moved intermittently so as to provide time intervals during which the tubing is stationary, thereby to allow the corrugating means to act. After the tubing has been corrugated and moved off the right end 14′ of the mandrel, it will be handled further in any suitable manner.

The precise configuration of the corrugations may be varied to meet the needs of the particular situation. Thus, the corrugations may be axial, helical, multiple-helical, intersecting helical, diamond patterned, or anything else. The corrugations will cover any desired portion of the tubing, including the region of the seam and/or elsewhere.

FIGURE 1 also shows heating means 19 which provide a heating zone arranged behind the presser means 17 but ahead of the corrugating means 18. Experience has shown that this heating means, can, in certain cases, be dispensed with.

In accordance with the present invention, the adhesive which is applied to the tubing is one which hardens in two stages, the first stage being one wherein the adhesive is only partially hardened and is still yieldable to shearing stress, and the second stage being one in which the adhesive is fully hardened and no longer able to yield to shearing stresses. Furthermore, the apparatus shown in FIGURE 1 is operated at such a speed, i.e., the tubing is fed through the apparatus at such a rate, that the adhesive is still in its first stage while the tubing is being subjected to the action of the corrugating means 18. While, as set forth above, the first stage is not yet the second or final stage of the hardening process, the adhesive, already in its first stage, will nonetheless be strong enough (e.g., about 20 to 40% of its final strength) to hold the edges of the tubing together, during the corrugating operation, with sufficient strength to avoid rupture, i.e., tearing of the seam. The timing of the operation will be such that the adhesive does not reach its second stage until after the corrugating has been completed.

Figure 3:
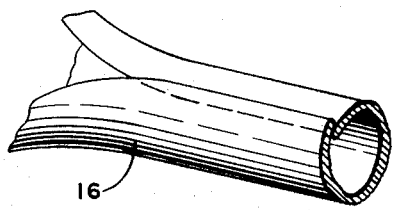
FIGURE 3 is a perspective view, partly in section, showing the tube which now has its edges joined together but is still uncorrugated.

FIGURE 3 shows a section of the tubing 16 after its edges have been secured to each other but before the tubing has been subjected to the action of the corrugating means.

Figure 4:
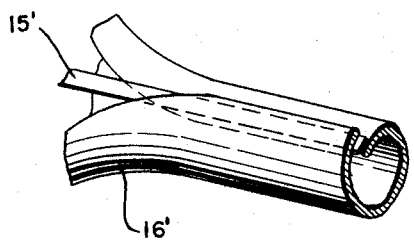
FIGURE 4 is a perspective view similar to FIGURE 3 but shows a different arrangement of the seam.

FIGURE 4 shows tubing 16′ whose seam is constituted by the overlapping edges between which there is a carrier foil 15′ which itself is adhesive coated on both sides. During continuous manufacture, the foil 15′ can be supplied from a suitable roll (not shown).

Figure 5:
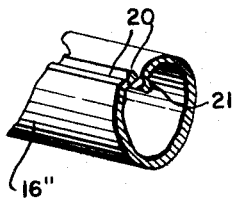
FIGURE 5 is a perspective view similar to FIGURES 3 and 4 but shows still another arrangement of the seam.

FIGURE 5 shows the tubing 16″ as having edges provided with longitudinal creases 20 and 21 which, once the strip has been shaped into the round tubing, overlie each other and are pressed into each other by means of the presser means 17.

It will be seen from the above that the method according to the invention relies upon the property of modern adhesives of developing a considerable adhesive strength after hardening initially, in a first stage, for a short time, and of also permitting the surfaces which are thus cemented to each other to be deformed or molded, whereby due to plastic deformation the originally opposite surface portions of the cemented parts will shift relative to the adhesive. After the deformation of the material has been completed, the initially hardened adhesive will, in a second stage, harden completely without suffering any appreciable loss in adhesive strength. In many cases it will even be sufficient if the surfaces to be cemented together will be kept under compression only for a part of the period required for the complete hardening of the adhesive. The adhesive will then already attain an adhesive strength sufficient to permit the finished products to be stored for the remainder of the hardening period without requiring any additional external force. After the initial hardening period during which the adhesives which are here being considered already develop a strong adhesive strength, these adhesives will still remain plastically deformable for some time, whereas in their completely hardened condition they will become very brittle and possess an extremely great adhesive strength. For this reason, it is not possible to provide a smooth tube which has a cemented seam extending parallel to its axis with corrugations after the adhesive has hardened completely without incurring the danger that the cemented surfaces might tear apart or that their adhesive strength will at least be considerably affected. There are now suitable adhesives with the mentioned properties available for all materials of which such tubes might be made, that is, for weldable metals and plastics as well as for those which are difficult to weld or entirely unweldable. Therefore, it is now possible according to the invention to produce corrugated tubes even from materials which are hard to weld or entirely unweldable by bending flat strips of such materials into slotted tubes, cementing the overlapping edges of such a tube together, and providing it with corrugations during the hardening period of the adhesive.

Since, after at least one of the edges of the slotted tube has been coated, it is sufficient if the two edges are pressed against each other by providing a supporting tool at the inside of the tube, and since contrary to welding electrodes, these supporting tools are practically not subject to any wear, the corrugated tubes which are produced according to the invention by being provided with cemented longitudinal seams, especially seams extending parallel to their axes, and by being provided with corrugations while the adhesive is hardening, may also be produced in one continuous process as well as of any desired length. The rapid increase in the adhesive strength at the beginning of the hardening process in connection with the plastic deformation of the adhesive which thereafter is still possible without any appreciable loss in the adhesive strength also permits the corrugated tubes to be produced at a considerable speed. When the tube leaves the shaping tools in which it is bent to its tubular shape from the flat strip and in which its overlapping edges are coated with the adhesive and are then pressed against each other, it runs along a runway which, as explained above, may be provided with means for heating the tube, for example, with hot air or infrared radiation, in order to attain a certain degree of hardening of the adhesive before the smooth tube which is produced by cementing enters into the corrugating tools.

It is also advisable according to the invention to provide further means (not shown) for again heating the tube after it passes out of the corrugating tools, so that the adhesive will be hardened completely within the shortest possible time.

Another feature of the invention consists in also heating the shaping tools and the corrugating tools in order either to complete the hardening of the adhesive within the shortest possible distance of the continuous movement of the tube through the consecutive series of shaping tools, heating means, corrugating tools and final heating means, or in order to complete the hardening process at least to such an extent that, when the tube leaves the machine, its seam will already have a sufficient solidity to permit the tube to be stored.

The adhesives which are suitable for carrying out the method according to the invention are, for example, adhesives of the class including epoxide resins, polyacryl resins, polyamides, polybutadienes, polymethanes, polyethylenes, polystyrenes, and the like, that is, such adhesives which attain a high adhesive strength at the beginning of the hardening period and possess the properties previously mentioned of opposing shearing stresses with practically no resistance while they are only partly hardened and of then allowing a slight relative displacement of the originally connected surface portions, and of thereafter allowing the adhesive to harden completely without suffering any appreciable loss in adhesive strength.

For coating the overlapping edges of the slotted tube, it has been found very advisable to apply the adhesive by means of a carrier or applicator strip or foil which is coated with the adhesive at both sides, as shown in FIGURE 4. For this purpose, it is advisable to use a very extent interengage with each other and the groove will then also serve to receive the adhesive or the foil which is coated with the adhesive. This is shown in FIGURE 5.

In many cases, these channel-like grooves in the edges to be cemented only need to be very shallow, while sometimes it may be advisable to make the edges of such a shape that a regular flanged seam will be produced which in the finished condition of the tube will be securely held together not only by the interlocking engagement of the edges but also by the adhesive.

The adhesive suitable for use in practicing the process according to the present invention may be any one of many, the only significant factor being that the adhesive is one which, as stated above, undergoes two hardening stages, in the first of which stages the adhesive, though already relatively strong and fully capable of holding together the edges of the slotted tubing while the same undergoes the corrugating operation, is still capable of yielding under the shear stresses to which the tubing is subjected. The timing of the process according to the present invention is such that only after the tubing has been corrugated will the adhesive reach its second and final stage, i.e., at a time when the need for allowing for a shearing stress has passed.

The adhesives suitable for use in the present invention may be adhesives made up of two constituents, namely, substances which consist of the actual adhesive and a hardening or setting agent. There can be used, for example, epoxy resins which are made from glycerine-epichlorohydrine, dioxyphenyldimethylmethane and polyoxybenzole. The structural formula is as follows:

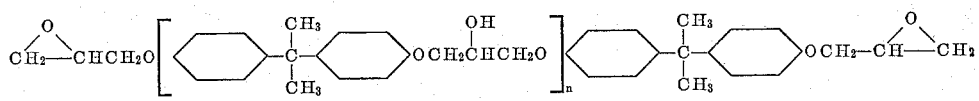

thin foil of the same material of which the tube itself is made. For example, if the tubing has a thickness of 0.2 mm., the foil should be about 0.02 to 0.05 mm. thick. Although this carrier foil only has to serve the purpose of carrying the adhesives on both sides, it should, when the tube is cemented, have the same solidity as the tube itself. In this manner it is very easily possible in each particular case to apply the proper amount of adhesive to the surfaces which are to be cemented. The application of the adhesives by means of a foil which is coated on both sides and is inserted between the edges to be cemented permits the adhesive already to start to set before it comes into contact with the edges to be cemented. This also serves to increase the speed of production of the tubes.

In particular cases, it may be advisable to make the carrier foil of the adhesive of a material different from that of which the slotted tube itself consists. Generally, however, the carrier foil should consist of a material which has a solidity at least similar to that of the corrugated tube to be produced. Finally, the carrier foil may also consist of a material which is integrally connected to the adhesive and, due to the reaction during the hardening process, combines with the adhesive to form one homogeneous body, rather than remaining between the cemented edges of the split tube in the form of a separate layer. The carrier foil may in this case substantially form the hardening agent for the adhesive and, although it is originally of a sufficient mechanical strength to carry the adhesive and to be inserted in the form of a strip between the edges of the tube, it will dissolve completely or almost completely in the adhesive during the subsequent hardening reaction, for example, under the influence of heat.

It has further been found advisable according to the invention to provide the edges of the slotted tube to be cemented together with a channel-like groove by means of the shaping tools so that, when the overlapping edges of the tube are attached to each other, they will to some If such an epoxy resin is brought together with a suitable setting agent, as, for example, an aliphatic diamine having the general formula $C_nH_{2n}(NH_2)_2$, dicarboxylic acid anhydride, sulfonic acid, amines and others, the setting begins. This setting, as is well known, can take place at temperatures of between approximately 20° C. and 250° C. In general, the lower the temperature the longer will be the time required for the setting to take place. Furthermore, the maximum strength which is attained if the adhesive is allowed to set a relatively low ambient temperature is generally lower than the strength that can be atained if the seting occurs under he application of heat. Thus, the use of the heating zone 18 will, in practice, be preferable although it may, depending on the particular circumstances, be dispensed with.

Also suitable is a solvent-free, polymerizable cold-hardening monocomponent adhesive on a cyanoacryl acid ester base, in which the second component is the humidity of the air. The polymerization begins from the edges in. This adhesive hardens rapidly without catalyst and without the application of pressure, normally within 2 to 4 minutes. The adhesive is elastic and is particularly well suited for flexible tubing as well as for tubing which is subjected to vibration. The maximum strength is reached after about 24 hours, and the adhesive maintains its strength to temperatures of above 80° C.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing corrugated tubes, comprising the steps of: shaping a flat strip of material to form a tube with a longitudinal slot and coating at least one of the two overlapping parallel edges of the tube with an adhesive which is suitable for the particular material of the tube, said adhesive being one which hardens in two stages, the first stage being one wherein the adhesive is only partially hardened and is still yieldable to shearing stresses to which the adhesive, while in its first stage, will be subjected during a subsequent operation in which the tube is corrugated, and the second stage being one in which the adhesive is fully hardened and no longer able to yield to such shearing stresses; pressing the overlapping edges of the slotted tube together to form a seam; and corrugating the tube while said adhesive is still in said first stage thereof, whereby said adhesive will not attain its second stage until the need for allowing for a shearing stress has passed said flat strip of material being flexible, strong and thick enough to withstand the shaping and corrugating operations.

2. A method as defined in claim 1, including pressing together the overlapping edges of the slotted tube immediately subsequent to its being shaped into tubular form and to being coated with the adhesive along at least one of said edges, and heating said tube prior to its being corrugated, for bringing said adhesive into said first stage thereof.

3. A method as defined in claim 2, comprising a further heating step for bringing said adhesive from its first stage into its second stage.

4. A method as defined in claim 3, wherein the heating of the material to form said tube and the adhesive applied thereto for bringing said adhesive in its first and second stage, respectively, is performed by maintaining the tools used for shaping and corrugating the tube in heated condition.

5. A method as defined in claim 1 wherein said adhesive is inserted between the edges of the slotted tube by means of an applicator strip carrying the adhesive.

6. A method as defined in claim 5, wherein said applicator strip carrying the adhesive consists of a material substantially similar to the material of which the tube is made.

7. A method as defined in claim 5, wherein said applicator strip carrying the adhesive is coated with said adhesive on both sides.

8. A method as defined in claim 5, wherein said applicator strip carrying the adhesive consists substantially of a hardening agent for hardening the adhesive and forming a homogeneous body with the adhesive after the same has hardened.

9. A method as defined in claim 5, wherein the adhesive on said applicator strip has already begun to harden while being inserted between the edges of the slotted tube.

10. A method as defined in claim 1, further comprising the step of bending the overlapping edges of the slotted tube so that said edges at least partly interengage each other.

11. A method as defined in claim 1, wherein during said step of shaping said flat strip into a slotted tube, said strip is also provided near one edge thereof with a shallow longitudinal groove for receiving the other edge to interlock said overlapping edges with each other.

12. A method as defined in claim 1, further comprising the step of providing a longitudinal groove in said strip near one edge thereof for receiving the other edge to interlock said edges with each other and to impart a flanged seam to the tube.

References Cited by the Examiner

UNITED STATES PATENTS

| | | | |
|---|---|---|---|
| 2,640,501 | 6/1953 | Scott et al. | 156—195 X |
| 2,784,763 | 3/1957 | Shorts | 156—206 X |
| 2,876,725 | 3/1959 | Buck et al. | 156—306 |
| 3,066,063 | 11/1962 | Ecklund et al. | 156—203 X |

FOREIGN PATENTS

| | | |
|---|---|---|
| 919,405 | 10/1954 | Germany. |
| 372,570 | 5/1932 | Great Britain. |

EARL M. BERGERT, *Primary Examiner.*

P. DIER, *Assistant Examiner.*